US012138909B2

(12) United States Patent
Veis et al.

(10) Patent No.: US 12,138,909 B2
(45) Date of Patent: Nov. 12, 2024

(54) DUAL DRIVE PRINT MEDIA CONVEYOR BELT

(71) Applicant: HP SCITEX LTD., Netanya (IL)

(72) Inventors: Alex Veis, Netanya (IL); Semion Birger, Netanya (IL)

(73) Assignee: HP SCITEX LTD., Netanya (IL)

( * ) Notice: Subject to any disclaimer, the term of this patent is extended or adjusted under 35 U.S.C. 154(b) by 68 days.

(21) Appl. No.: 17/747,760

(22) Filed: May 18, 2022

(65) Prior Publication Data

US 2022/0402277 A1 Dec. 22, 2022

(30) Foreign Application Priority Data

Jun. 17, 2021 (EP) .................................... 21180017

(51) Int. Cl.
*B41J 11/00* (2006.01)
*B41J 2/21* (2006.01)

(52) U.S. Cl.
CPC ............ *B41J 11/007* (2013.01); *B41J 11/008* (2013.01); *B41J 2/2103* (2013.01)

(58) Field of Classification Search
CPC ........ B41J 11/007; B41J 11/008; B41J 2/2103
See application file for complete search history.

(56) References Cited

U.S. PATENT DOCUMENTS 3,889,801 A 6/1975 Boyer
4,753,119 A 6/1988 Kuspert
5,507,481 A 4/1996 Meyer et al.
5,757,407 A 5/1998 Rezanka
5,931,090 A 8/1999 Ohkawa
6,179,419 B1 1/2001 Rasmussen et al.
6,290,351 B1 9/2001 Merz
7,914,099 B2 3/2011 Loh et al.
8,839,941 B2 9/2014 Fehr et al.
2002/0018097 A1 2/2002 Kitahara et al.
2003/0038420 A1 2/2003 Cleary et al.
2005/0046667 A1 3/2005 Ando et al.
2006/0186593 A1 8/2006 Shibuya
2007/0045939 A1* 3/2007 Toya .................. G03G 15/1615 198/806
2009/0301237 A1 12/2009 Everman
2010/0244364 A1 9/2010 Komiyama et al.
(Continued)

FOREIGN PATENT DOCUMENTS

EP 0193567 B1 12/1987
EP 1655141 A2 5/2006
(Continued)

OTHER PUBLICATIONS

Bell-Everman, "Linear Motion Engineering Guide", Oct. 2018 [Online] Available at: https://www.bell-everman.com/linear-motion-engineering-guide.

*Primary Examiner* — Justin Seo
(74) *Attorney, Agent, or Firm* — Jordan IP Law, LLC

(57) ABSTRACT

In one example, a system to convey print media through a print zone in a printer includes an endless conveyor belt in a loop, a pair of drivers to circulate the conveyor belt through the print zone from opposite ends of the loop, an encoder to measure movement of the conveyor belt, and a controller programmed to control both drivers driving the conveyor belt based on measurements from the encoder.

13 Claims, 7 Drawing Sheets

(56) References Cited

U.S. PATENT DOCUMENTS

| | | | |
|---|---|---|---|
| 2011/0128557 | A1 | 6/2011 | Kinoshita et al. |
| 2011/0293346 | A1 | 12/2011 | Sato |
| 2014/0178115 | A1 | 6/2014 | Fujisawa et al. |
| 2014/0240423 | A1 | 8/2014 | Cressman et al. |
| 2017/0043598 | A1 | 2/2017 | Sanaei et al. |
| 2018/0281472 | A1 | 10/2018 | Terradellas Callau et al. |
| 2019/0291475 | A1 | 9/2019 | Ota |
| 2020/0230981 | A1 | 7/2020 | Gunji |
| 2020/0254789 | A1 | 8/2020 | Martin et al. |
| 2022/0402282 | A1 | 12/2022 | Veis et al. |

FOREIGN PATENT DOCUMENTS

| | | | |
|---|---|---|---|
| EP | 3121021 | A2 | 1/2017 |
| EP | 3150391 | A2 | 4/2017 |
| EP | 3308969 | A1 | 4/2018 |
| EP | 3392048 | A1 | 10/2018 |
| EP | 3594005 | A1 | 1/2020 |
| JP | 57-156947 | A | 9/1982 |
| JP | 07-187441 | A | 7/1995 |
| JP | 07-281495 | A | 10/1995 |
| JP | 4057115 | B2 | 3/2008 |
| JP | 2019-001646 | A | 1/2019 |
| WO | 2021/142326 | A1 | 7/2021 |

* cited by examiner

DUAL DRIVE PRINT MEDIA CONVEYOR BELT

BACKGROUND

In some large industrial inkjet printers, a vacuum belt is used to hold down print media flat for printing. The vacuum belt forms a loop driven by a pulley at one end of the loop around an idler pulley at the other end of the loop. Print media is carried along the upper run of the belt loop through a print zone in which ink is dispensed on to the print media from a printing unit above the belt.

DRAWINGS

The same part numbers designate the same or similar parts throughout the figures. The figures are not necessarily to scale.

DESCRIPTION

Figure 1:
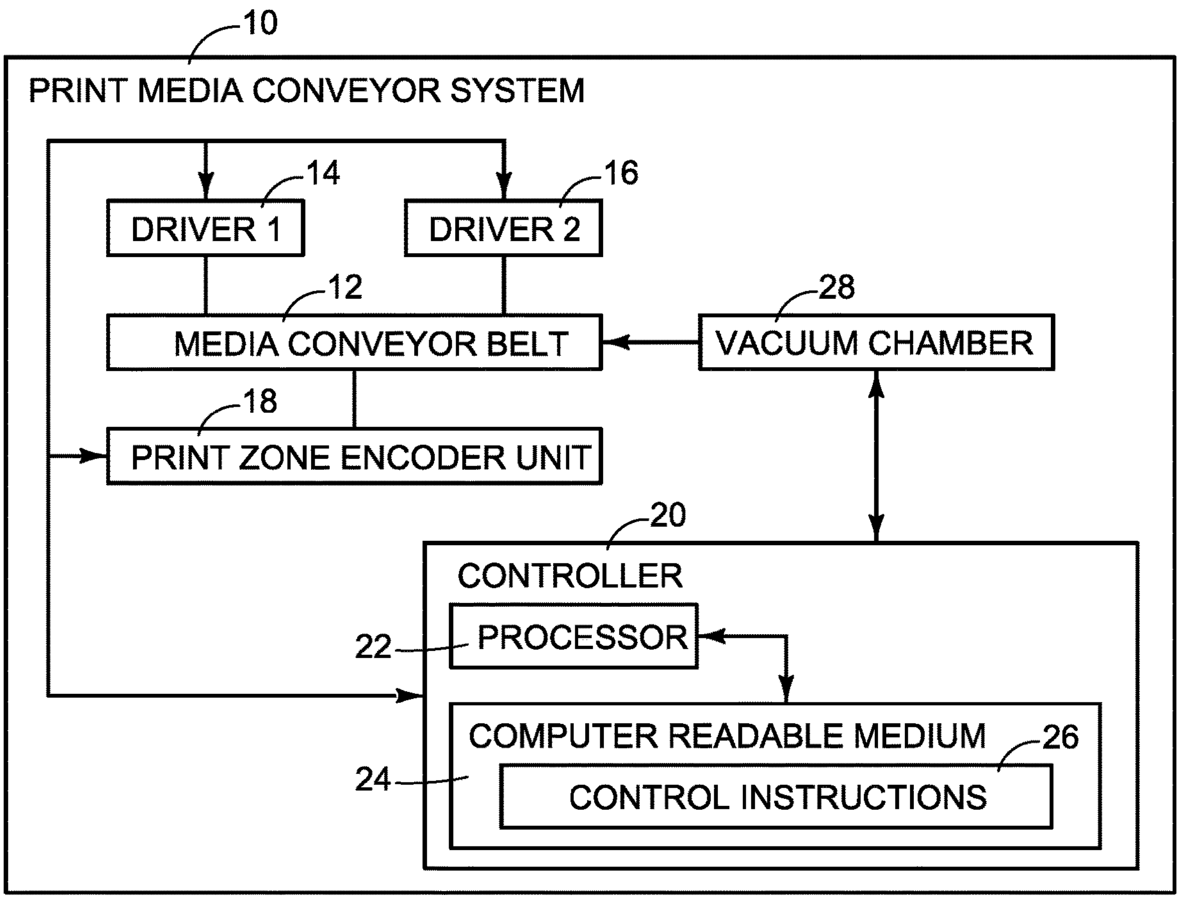
FIG. 1 is a block diagram illustrating one example of a dual drive print media conveyor system.

In some large industrial inkjet printers, a vacuum belt is used to hold down media flat for printing. The vacuum belt forms a loop driven by a pulley at one end of the loop around an idler pulley at the other end of the loop. The print media is carried along the upper run of the belt loop through a print zone where ink is dispensed on to the media from a printing unit above the belt. The printing unit may include multiple print bars that extend across the full width of the belt to print each of multiple corresponding color planes on to the media in a single pass. The vacuum holding down the print media applies strong normal forces to the belt as it moves through the print zone, creating friction that can cause small jumps in belt speed. Also, in response to the substantial operating stresses in an industrial printing environment, a belt drive pulley may develop an eccentric wobble that causes unwanted variations in belt speed through the print zone. An encoder gives feedback to a controller to try to correct for unwanted changes in belt speed, and thus synchronize the position of the print media on the belt to the printing unit dispensing ink, so that that ink is dispensed at the proper locations on the print media. Uncorrected changes in belt speed can adversely affect print quality.

Belts can pull but not push. If the encoder indicates the belt should speed up in the print zone, then the drive pulley is accelerated to pull forward on the upper run of belt. If the encoder indicates the belt should slow in the print zone, then the drive pulley is decelerated to pull back on the lower run of belt. The lower run of belt travels further to the print zone than the upper run of belt. Consequently, it takes longer to slow the belt in the print zone than it does to speed up the belt in the print zone. As a result of this deceleration delay, the belt speed control system is slower to correct changes in belt speed, operating at a lower gain with more dynamic errors than it might without a deceleration delay.

A new drive system has been developed to help more quickly correct the speed of a conveyor belt that carries print media through the print zone in a printer. Rather than driving the belt from one end of the loop, the belt is driven from both ends of the loop with independent drivers. In one example, a pair of pulleys circulates the belt from opposite ends of the belt loop at the urging of a respective pair of drive motors, an encoder measures movement of the belt through the print zone, and the drive motor for each pulley is controlled based on measurements from the encoder. For steady state operation, one pulley pulls the upper run of belt forward through the print zone and the other pulley simultaneously pulls the lower run of belt back at the same linear speed to circulate the belt.

If the encoder indicates the belt should speed up in the print zone, then one pulley is accelerated to pull forward faster on the upper run of belt. If the encoder indicates the belt should slow in the print zone, then the other pulley is decelerated to pull back on the upper run of belt. One pulley pulls forward on the upper run of belt for acceleration and the other pulley pulls back on the upper run of belt for deceleration, so that deceleration occurs without delay compared to acceleration, allowing the speed control system to operate at higher gain with lower dynamic errors.

These and other examples described below and shown in the figures illustrate but do not limit the scope of the patent, which is defined in the Claims following this Description.

As used in this document: "and/or" means one or more of the connected things; and a "computer readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory.

FIG. 1 is a block diagram illustrating one example of a dual drive print media conveyor system 10. Referring to FIG. 1, system 10 includes an endless belt 12 in a loop to convey print media for printing, a pair of drivers 14, 16 to circulate belt 12 from opposite ends of the loop, and an encoder unit 18 located under the print zone to measure movement of belt 12 through the print zone. System 10 also includes a controller 20 operatively connected to drivers 14, 16 and encoder unit 18. Controller 20 represents the processing and memory resources and the programming, electronic circuitry and components needed to control the operative elements of system 10. Controller 20 may include distinct control elements for individual system components. In the example shown in FIG. 1, controller 20 includes a processor 22 and a computer readable medium 24 with control instructions 26 that represent programming to control drivers 14, 16, and thus the speed of belt 12, based on belt movement measured by encoder unit 18. Controller 20 may also include programming to control a printing unit dispensing ink based on movement measured by encoder unit 18, for example as described below with reference to FIG. 9.

While any suitable drivers 14, 16 may be used to circulate belt 12, it is expected that each driver 14, 16 usually will be implemented with a pulley and a motor to turn the pulley at the direction of controller 18, for example as described below with reference to FIGS. 3-6. Where conveyor belt 12 is implemented as a vacuum belt, system 10 may include a vacuum chamber 28 operatively coupled to belt 12 to hold down print media flat on belt 12.

Figure 2:
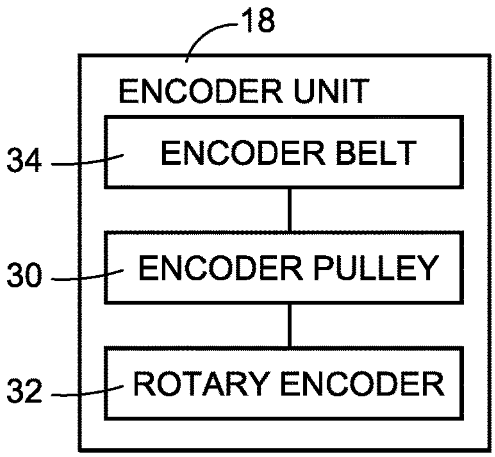
FIG. 2 is a block diagram illustrating an example implementation for a print zone encoder unit in the conveyor system shown in FIG. 1.

FIG. 2 illustrates an example implementation for a print zone encoder unit 18 shown in FIG. 1. Referring to FIG. 2, encoder unit 18 includes an encoder pulley 30, a rotary encoder 32 operatively connected to encoder pulley 30, and an endless belt 34 engaging print media conveyor belt 12 in the print zone so that encoder belt 34 moves with conveyor belt 12. Encoder belt 34 wraps encoder pulley 30 to turn pulley 30 in response to conveyor belt 12 moving through the print zone. Encoder belt 34 converts linear movement of belt 12 through the print zone to rotation of encoder pulley 30 that is measured by rotary encoder 32. The encoder measurements are used by controller 20 in FIG. 1 to control the speed of conveyor belt 12 and/or the timing of a printing unit dispensing ink based on the movement of conveyor belt 12 in the print zone.

Figure 3:
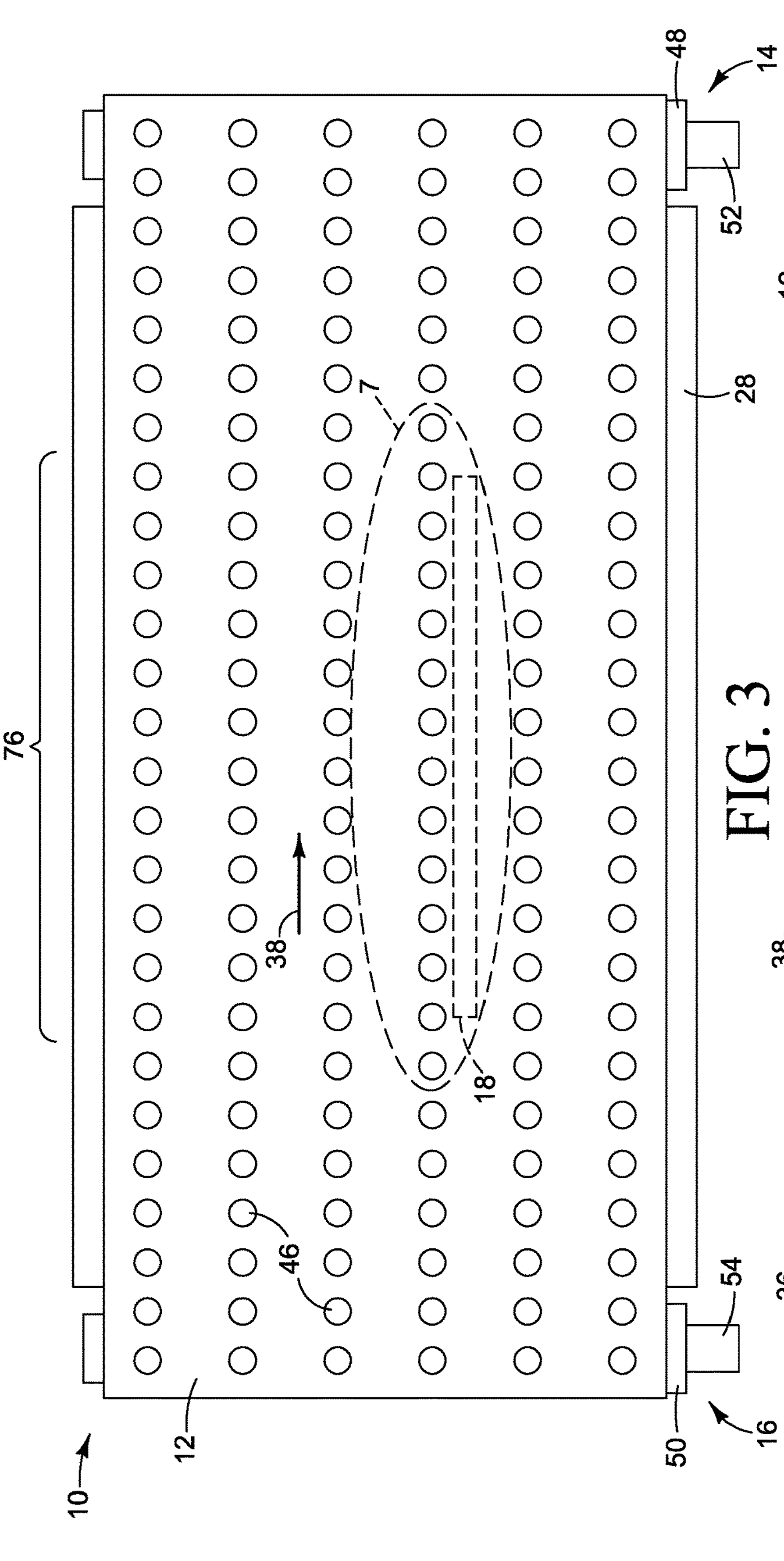
FIGS. 3 and 4 are plan and elevation views illustrating an example implementation for a print media conveyor system shown in the block diagram of FIG. 1.
Figure 4:
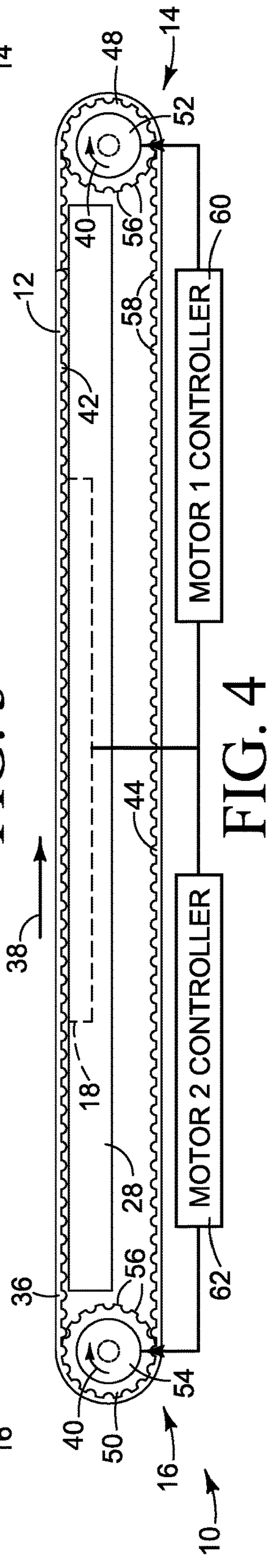
Figure 5:
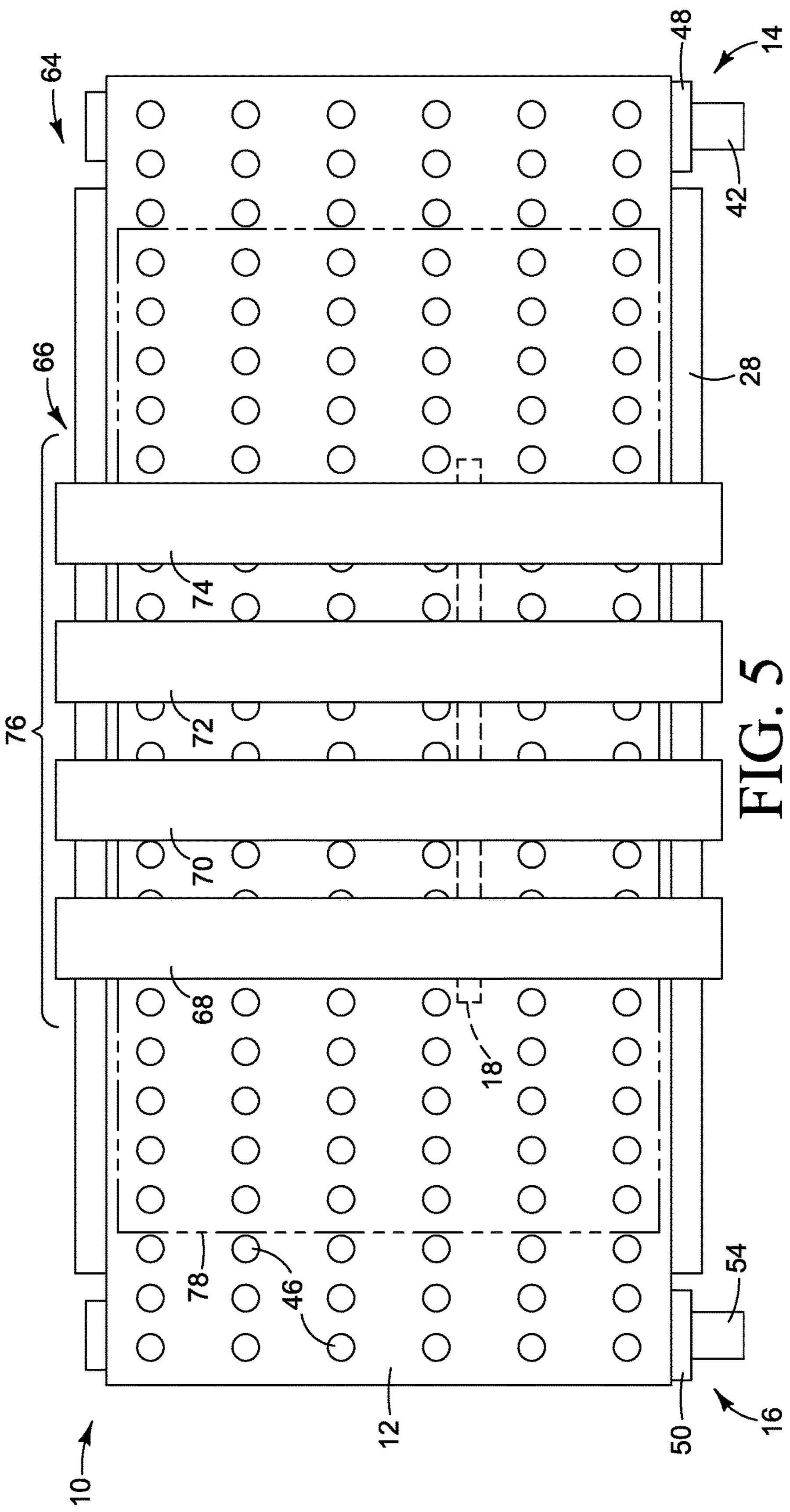
FIGS. 5 and 6 are plan and elevation views illustrating an example inkjet printer with a print media conveyor system from FIGS. 3 and 4.
Figure 6:
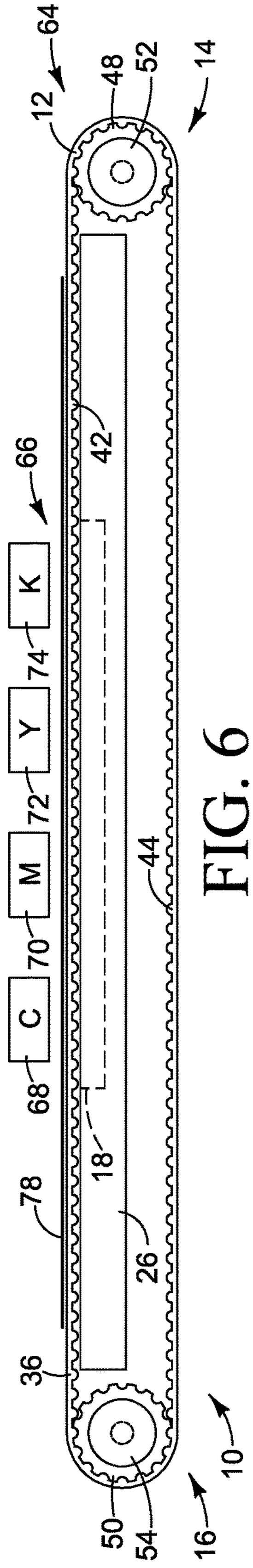
Figure 7:
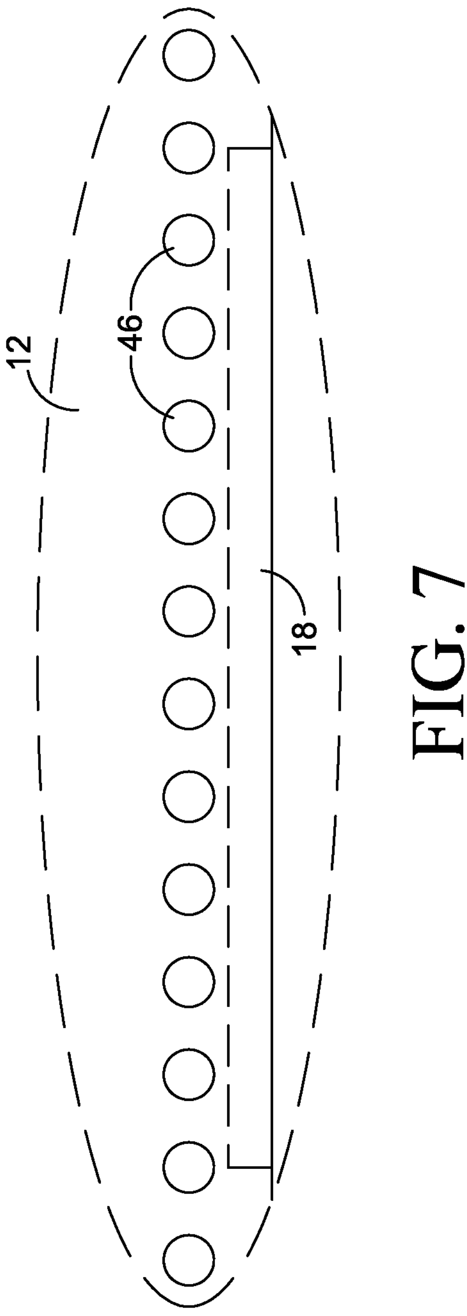
FIG. 7 is a plan view detail from FIG. 3.
Figure 8:
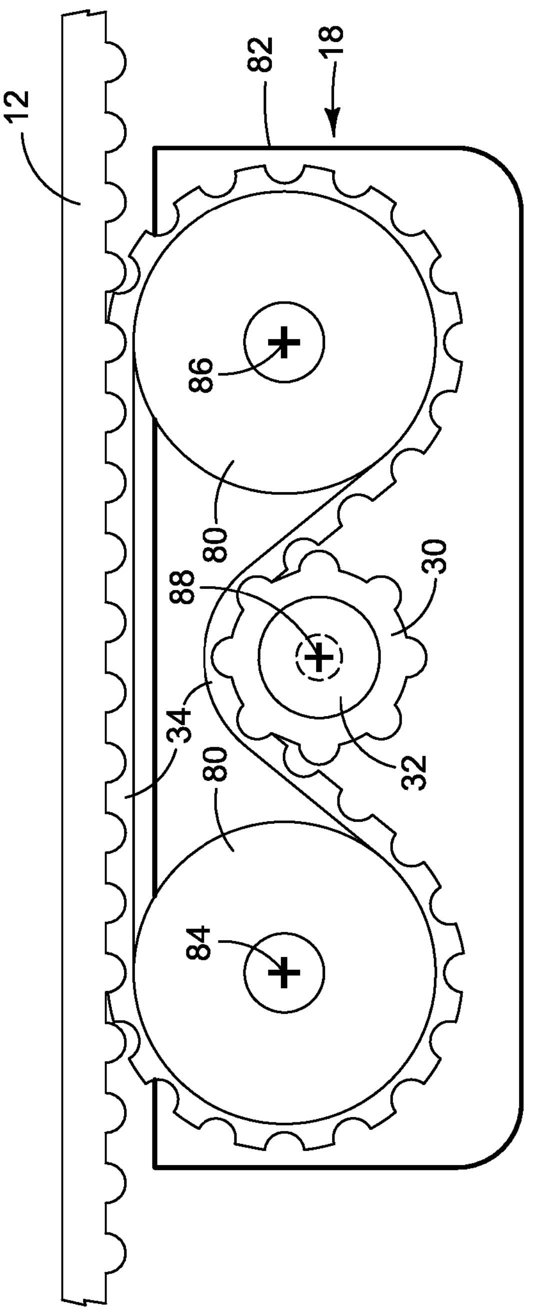
FIG. 8 is an elevation view of the detail of FIG. 7.

FIGS. 3 and 4 are plan and elevation views illustrating an example implementation for a print media conveyor system 10 shown in the block diagram of FIG. 1. FIGS. 5 and 6 are plan and elevation views illustrating an example inkjet printer with a print media conveyor system 10 from FIGS. 3 and 4. FIG. 7 is a plan view detail from FIG. 3. FIG. 8 is an elevation view of the detail of FIG. 7.

Referring to FIGS. 3 and 4, print media conveyor system 10 includes an endless print media conveyor belt 12 in a loop 36 and a pair of drivers 14, 16 to circulate belt 12 from opposite ends of loop 36. Drivers 14, 16 circulate belt 12 clockwise in FIG. 3 to convey print media to the right for printing, as indicated by direction arrows 38 and 40. First driver 14 pulls forward (to the right) on an upper run 42 of conveyor belt 12 in FIGS. 3 and 4 and second driver 16 pulls back (to the left) a lower run 44 of conveyor belt 12. Belt 12 includes vacuum holes 46 operatively connected to a vacuum chamber 28 along upper run 42.

In the example shown in FIGS. 3 and 4, each driver 14, 16 includes a pulley 48, 50 at opposite ends of belt loop 36 and a motor 52, 54 to turn the corresponding pulley 48, 50. Teeth 56 on pulleys 48, 50 engage teeth 58 on belt 12 to circulate belt 12 at the urging of motors 52, 54. As shown in FIG. 4, a controller 18 from FIG. 1 may include distinct control elements for each driver 14, 16—a controller 60 for first motor 52 and a controller 62 for second motor 54. Both motor controllers 60, 62 control the speed of motors 52, 54 based on measurements from encoder unit 18. Although conveyor belt 12 is shown as a single belt in FIGS. 3 and 4, a print media conveyor belt 12 could be implemented as a series of multiple belts spaced apart from one another laterally across the print zone, with the belts circulated together with drivers 14, 16.

Referring to FIGS. 5 and 6, an inkjet printer 64 includes a printing unit 66 with print bars 68, 70, 72, 74 over belt 12. Printing unit 66 defines a print zone 76 in which ink is dispensed on to print media 78 moving with conveyor belt 12 under the print bars. Print media 78 is shown in phantom lines to not obscure belt 12. Each print bar 68-72 includes one or multiple inkjet printheads that dispense ink on to print media 78 according to “firing” signals timed to produce the desired images at the desired locations on media 78.

Referring to FIGS. 3-8, an encoder unit 18 is positioned under belt 12 in print zone 76 to measure belt movement through the print zone. In the example shown in FIG. 8, encoder unit 18 includes a toothed encoder pulley 30, guide pulleys 80, and a toothed encoder belt 34 wrapping pulleys 30 and 80. Encoder unit 18 also includes a rotary encoder 32 operatively connected to encoder pulley 30 to measure the rotation of encoder pulley 30. Pulleys 30, 80 are mounted to a frame 82 and configured to make the upper run of encoder belt 34 parallel to print media conveyor belt 12. A first guide pulley 80 has a first axis of rotation 84, a second guide pulley 68 has a second axis of rotation 86, and encoder pulley 30 has a third axis of rotation 88 between first axis 84 and second axis 86. Teeth on encoder belt 34 engage teeth on conveyor belt 12 and teeth on encoder pulley 30 so that the linear movement of conveyor belt 12 is transferred to encoder belt 34 which is converted to rotation of encoder pulley 30.

Rotary encoder 32 measures the rotation of encoder pulley 30 which represents the linear movement of conveyor belt 12 in print zone 66. Accordingly, rotary encoder 32 measures movement of conveyor belt 12 in print zone 76 indirectly through encoder pulley 30 and belt 34. While it is expected that rotary encoder 32 usually will be implemented as an incremental encoder, any suitable rotary encoder may be used. Also, the configuration of an encoder unit 18 in FIG. 8 is just one example. Other configurations are possible. For one example, it may be possible in some implementations to use a linear encoder to directly measure the movement of a print media conveyor belt 12 through the print zone. For another example, it may be possible in some implementations to drive an encoder pulley 30 directly by a print media conveyor belt 12.

Figure 9:
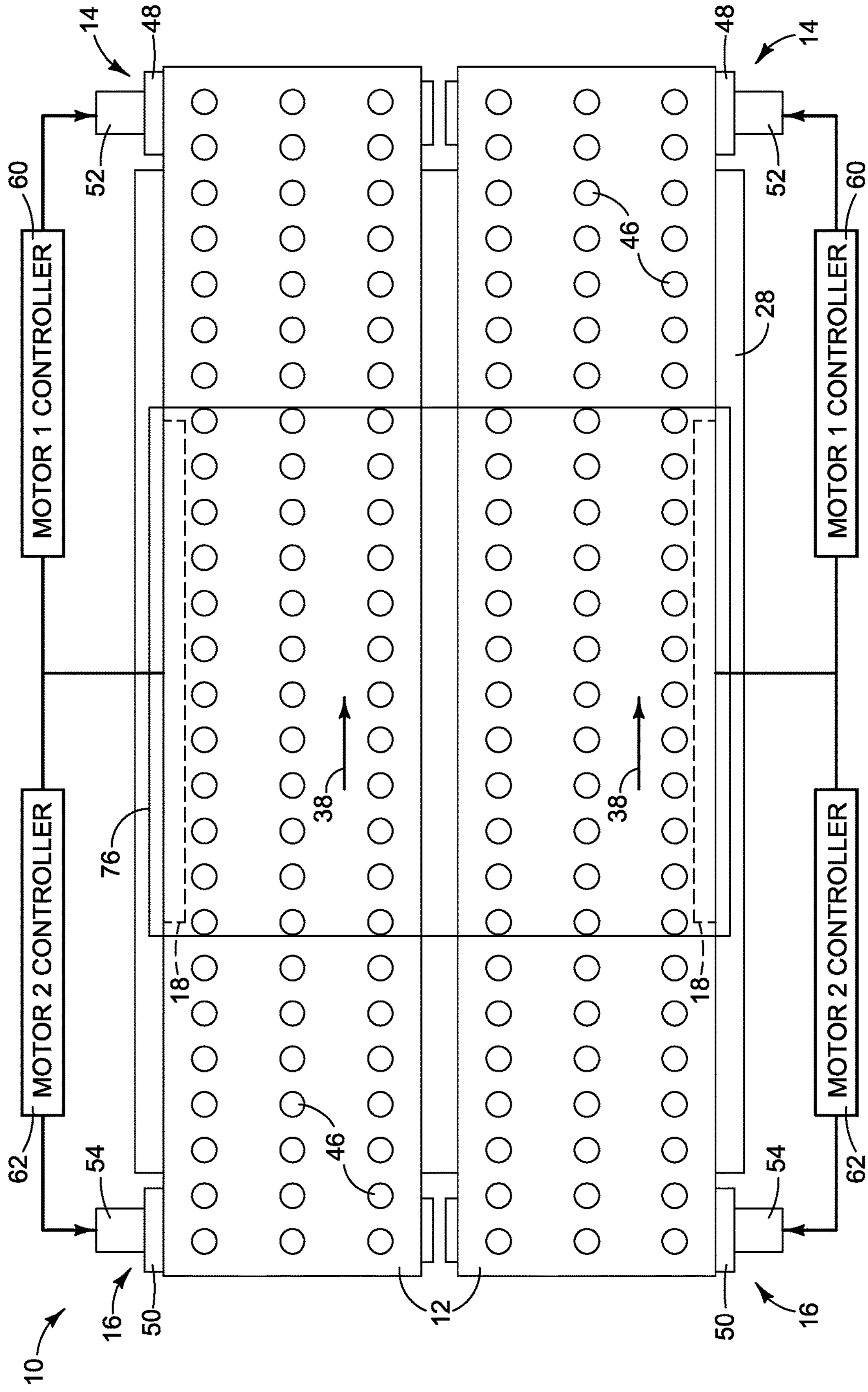
FIG. 9 is a plan view illustrating another example of a dual drive print media conveyor system.

FIG. 9 is a plan view illustrating another example of a dual drive print media conveyor system 10. Referring to FIG. 9, system 10 includes multiple print media conveyor belts 12 and a pair of drivers 14, 16 to circulate each belt 12. Each belt 12 includes vacuum holes 46 operatively connected to a vacuum chamber 28 along the upper run of belt 12. Each driver 14, 16 includes a pulley 48, 50 at opposite ends of the corresponding belt loop and a motor 52, 54 to turn the respective pulley 48, 50. An encoder unit 18 located under each belt 12 in print zone 76 measures movement of the corresponding conveyor belt 12 through the print zone. Motor controllers 60, 62 control the speed of motors 52, 54 based on measurements from encoder unit 18 for each belt 12.

Figure 10:
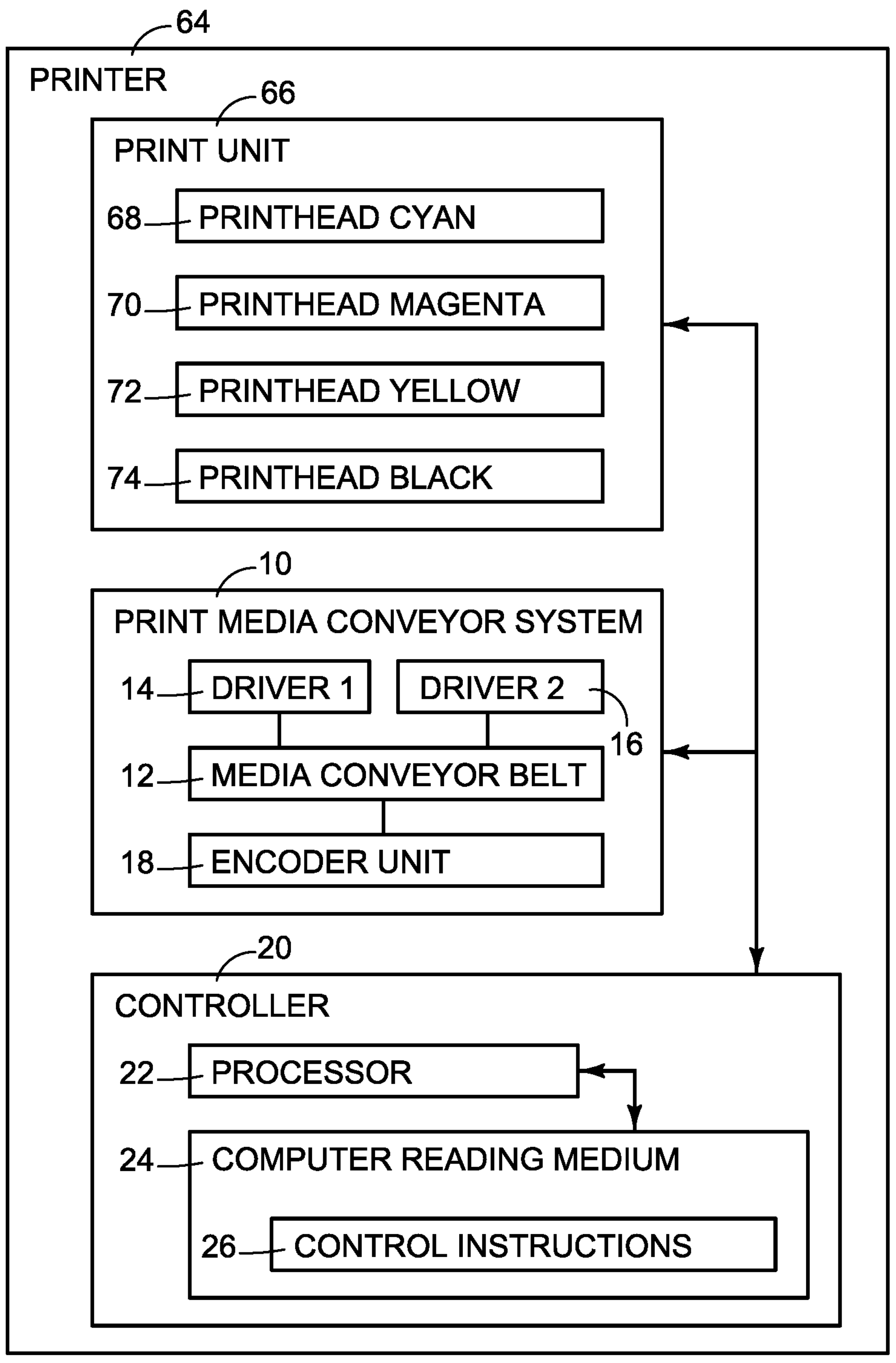
FIG. 10 is a block diagram illustrating an inkjet printer implementing one example of a dual drive print media conveyor system.

FIG. 10 is a block diagram illustrating an inkjet printer 64 implementing one example of a dual drive print media conveyor system 10. Referring to FIG. 10, printer 64 includes a printing unit 66 with printheads 68-74 that define a print zone where ink is dispensed on to print media carried by system 10. Each printhead 68-74 may be implemented, for example, as a print bar 68-74 shown in FIGS. 5 and 6. In this example, each printhead 68-74 dispenses cyan, magenta, yellow, and black ink, respectively. Each printhead 68-74 is operatively connected to a controller 20 executing control instructions 26 to dispense ink according to firing signals timed to produce the desired images at the desired locations on the print media.

Encoder unit 18 measures the movement of conveyor belt 12 in the print zone and communicates the measurements to controller 20. Processor 22 on controller 20 executing control instructions 26 controls drivers 14 and 16 to maintain the desired speed of media conveyor belt 12 through the print zone based on movement of media conveyor belt 12 measured by encoder unit 18, for example by correcting for jumps in belt speed and/or wobble in the driver pulleys. If the encoder in unit 18 indicates belt 12 should speed up in the print zone, then controller 20 controls driver 14 to pull forward faster on the upper run of belt 12. If the encoder in unit 18 indicates belt 12 should slow in the print zone, then controller 20 controls driver 16 to pull back on the upper run of belt 12. One driver pulls forward on the upper run of belt for acceleration and the other driver pulls back on the upper run of belt for deceleration. In one example, if the encoder in unit 18 indicates belt 12 should speed up in the print zone, then controller 20 controls drivers 14 and 16 to simultaneously pull forward faster on the upper run of belt 12 and back faster on the lower run of belt 12 and, if the encoder in unit 18 indicates belt 12 should slow in the print zone, then controller 12 controls drivers 14 and 16 to simultaneously pull back on the upper run of belt 12 and forward on the lower run of belt 12.

To further reduce the risk of speed changes adversely effecting print quality, processor 22 on controller 20 executing control instructions 26 may also control the firing signals for printheads 68-74 based on movement of media conveyor belt 12 measured by encoder unit 18, to produce the desired images at the desired locations on the print media, for example by synchronizing the firing signals to changes in belt speed. While it is expected that belt movement will usually be measured by an encoder located in the print zone, for example as shown in FIGS. 3-6, it may be possible or even desirable in some implementations to use an encoder located away from the print zone.

Figure 11:
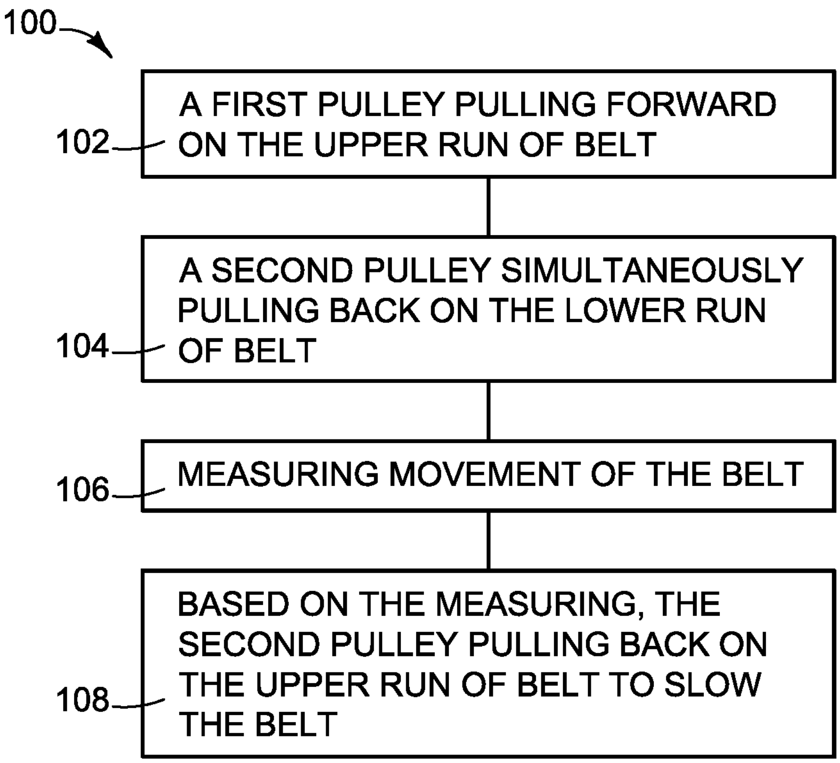
FIG. 11 is a flow diagram illustrating one example of a process for circulating an endless belt in a loop.

FIG. 11 illustrates a process 100 for circulating an endless belt in a loop, such as might be implemented in a dual drive conveyor system 10 shown in FIGS. 3 and 4. Part numbers in the following description of FIG. 11 refer to FIGS. 3 and 4. Referring to FIG. 11, process 100 includes a first pulley 48 pulling forward on an upper run of belt 42 from one end of the loop (block 102) and a second pulley 50 simultaneously pulling back on a lower run of belt 44 from the other end of the loop (block 104), with both pulleys 48, 50 pulling the respective run of belt 42, 44 at the same linear speed. Process 100 also includes measuring movement of the belt 12 (block 106), for example print zone encoder unit 18 measuring an unwanted burst of speed, and, based on the measuring, the second pulley 50 pulling back on the upper run of belt 42 to slow the belt 12 (block 108).

The examples shown in the figures and described above illustrate but do not limit the patent, which is defined in the following Claims.

"A", "an" and "the" used in the claims means one or more. For example, "an endless conveyor belt" means one or more endless conveyor belts and subsequent reference to "the conveyor belt" means the one or more endless conveyor belts.

The invention claimed is:

1. A system to convey print media through a print zone in a printer, the system comprising:
- an endless conveyor belt in a loop;
- a pair of drivers to circulate the conveyor belt through the print zone from opposite ends of the loop;
- an encoder unit located under the conveyor belt, and directly connected to the conveyor belt at, and in, the print zone, to measure movement of the conveyor belt in the print zone; and
- a controller programmed to control both drivers driving the conveyor belt based on measurements from the encoder unit.

2. The system of claim 1, wherein the controller is programmed to:
- control the first driver to pull forward on an upper run of the conveyor belt from one end of the loop;
- control the second driver to pull back on a lower run of the conveyor belt from the other end of the loop simultaneously with the first driver pulling forward on the upper run of the conveyor belt; and
- control both pulleys to pull the respective run of the conveyor belt at the same linear speed.

3. The system of claim 2, wherein the controller is programmed to, based on measurements from the encoder unit, control the second driver to pull back on the upper run of the conveyor belt to slow the conveyor belt.

4. The system of claim 2, wherein the controller is programmed to, based on measurements from the encoder unit:
- control the second driver to pull back on the upper run of the conveyor belt; and
- control the first driver to pull forward on the lower run of the conveyor belt simultaneously with the second driver pulling back on the upper run of the conveyor belt, to slow the conveyor belt.

5. The system of claim 1, wherein:
- each driver includes a motor; and
- the controller comprises a first motor controller programmed to control a first one of the motors based on feedback from the encoder unit and a second motor controller programmed to control a second one of the motors based on feedback from the encoder unit.

6. A system to convey print media through a print zone in a printer, the system comprising:
- an endless conveyor belt in a loop; a pair of pulleys to circulate the conveyor belt through the print zone from opposite ends of the loop;
- a pair of motors to turn the pulleys;
- an encoder unit directly connected to the conveyor belt under, and at, the print zone, with an encoder in the print zone to measure movement of the conveyor belt in the print zone; and
- a controller programmed to control both motors based on movement measured by the encoder.

7. The system of claim 6, wherein the encoder unit comprises:
- an encoder pulley;
- a rotary encoder operatively connected to the encoder pulley; and
- an endless encoder belt engaging the conveyor belt in the print zone and wrapping the encoder pulley to turn the encoder pulley in response to the conveyor belt moving in the print zone.

8. The conveyor system of claim 7, wherein:
- each pulley comprises a toothed pulley;
- the conveyor belt comprises an endless toothed conveyor belt wrapping the pulley;
- the encoder pulley comprises a toothed encoder pulley; and
- the encoder belt comprises an endless toothed encoder belt with teeth that engage teeth on the conveyor belt and teeth on the encoder pulley.

9. The system of claim 6, wherein in the controller comprises:
- a first motor controller programmed to control a first one of the motors based on feedback from the encoder; and
- a second motor controller programmed to control a second one of the motors based on feedback from the encoder.

10. The system of claim 6, wherein:
- the encoder comprises exactly one encoder; and
- the controller comprises a first motor controller programmed to control a first one of the motors based on feedback from the exactly one encoder and a second motor controller programmed to control a second one of the motors based on feedback from the exactly one encoder.

11. The system of claim 6, wherein:

the conveyor belt comprises multiple conveyor belts;

the pair of pulleys comprises multiple pairs of pulleys to circulate a corresponding one of the conveyor belts through the print zone from opposite ends of the loop;

the pair of motors comprises multiple pairs of motors each to drive a corresponding one of the pulleys;

the encoder comprises multiple encoders each to measure movement of a corresponding one of the conveyor belts through the print zone; and the controller is programmed to control both motors driving the pulleys for each conveyor belt based on measurements from the corresponding encoder.

12. A process for circulating an endless belt in a loop, comprising:

an encoder unit directly connected to the belt at a print zone;

a first pulley pulling forward on an upper run of the belt from one end of the loop;

a second pulley simultaneously pulling back on a lower run of the belt from the other end of the loop; and both pulleys pulling the respective run of the belt at the same linear speed.

13. The process of claim 12, comprising:

measuring movement of the belt; and based on the measuring, the second pulley pulling back on the upper run of the belt to slow the belt.

* * * * *